Figure 1:
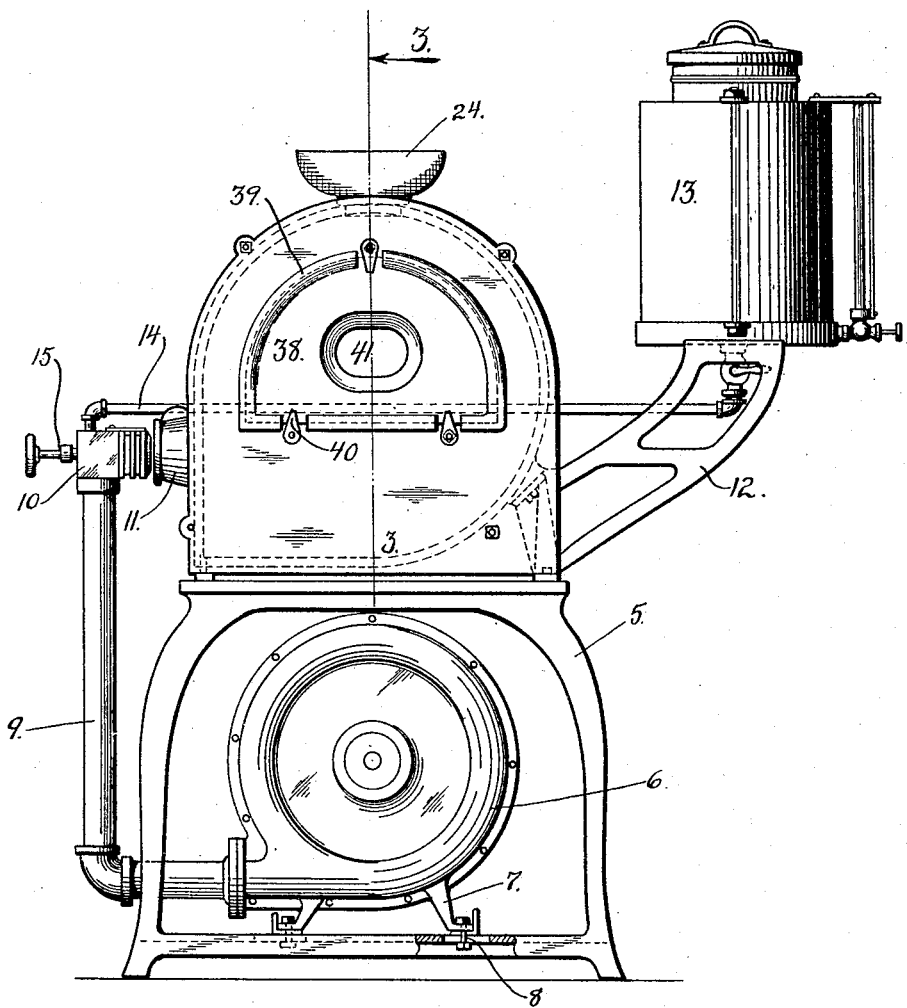

T. W. MUCKLE.
RIVET FORGE.
APPLICATION FILED MAR. 29, 1917.

1,230,593.

Patented June 19, 1917.
3 SHEETS—SHEET 1.

Inventor
Theodore W. Muckle.
By Wilkinson, Ginsta & MacKaye
his Attorneys

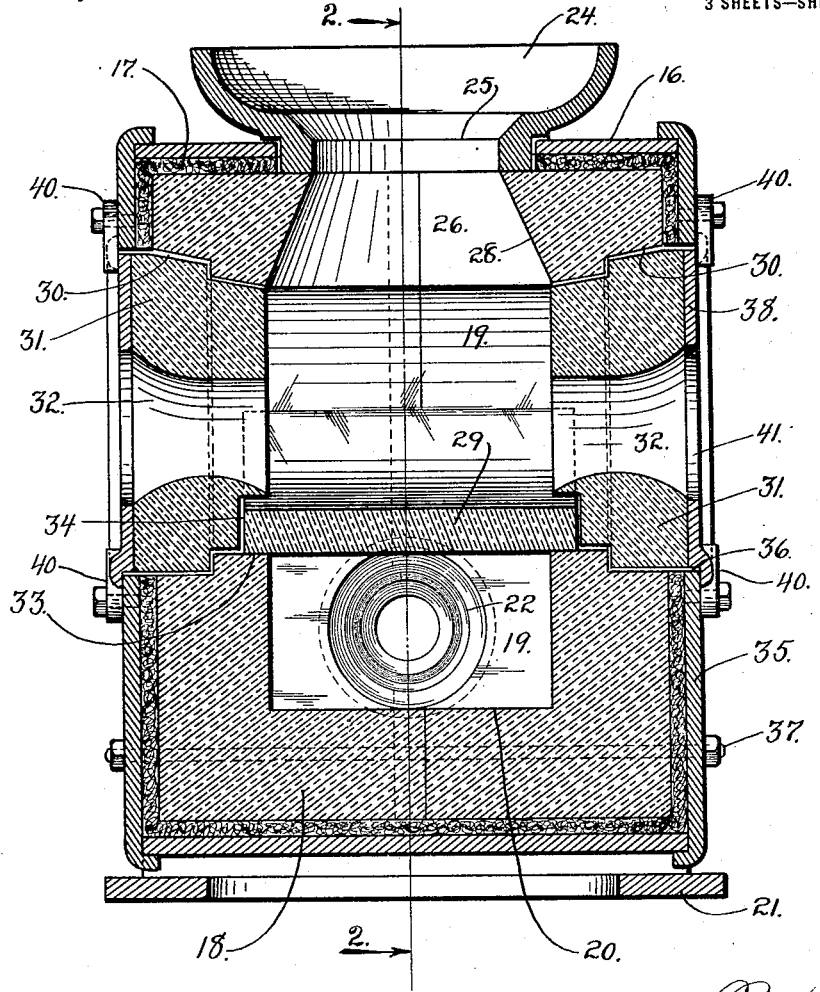
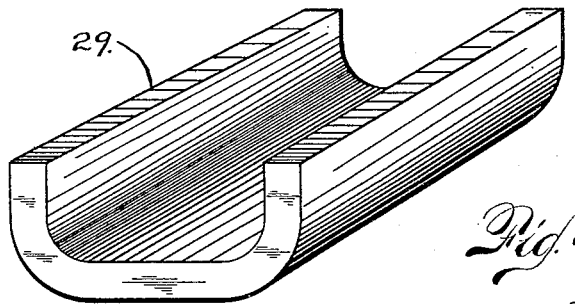

UNITED STATES PATENT OFFICE.

THEODORE W. MUCKLE, OF DENVER, COLORADO, ASSIGNOR TO WILLIS W. CASE, JR., OF DENVER, COLORADO.

RIVET-FORGE.

1,230,593.  Specification of Letters Patent.  Patented June 19, 1917.

Application filed March 29, 1917. Serial No. 158,376.

*To all whom it may concern:*

Be it known that I, THEODORE W. MUCKLE, a citizen of the United States, residing at the city and county of Denver and State of Colorado, have invented certain new and useful Improvements in Rivet-Forges; and I do hereby declare the following to be a full, clear, and exact description of the invention, such as will enable others skilled in the art to which it appertains to make and use the same.

This invention relates to improvements in furnaces or forges for the heating of rivets or other small articles in quantities.

As the old type of coke forge has become more or less obsolete, the present invention is more particularly designed as an improvement over that type commonly known as oil or gas forges.

In these oil or gas forges, the rivets have heretofore been dumped on to the refractory bottom lining of the furnace, and the flame blast played directly thereon. As combustion at this stage is incomplete, there is manifestly caused the oxidation and scaling of the rivets, and not only is this true and objectionable, but also these oxidized scales drop to the bottom of the furnace and depositing on its lining, the sulfur from the fuel forms iron sulfid, which vitally attacks fire clay and other refractory materials, a matter which is even more serious.

This type of furnace, therefore, to a large degree has proven more or less unsatisfactory, for as the flame bed becomes rapidly burnt out and destroyed, the furnace must be frequently taken apart for relining, at much loss of time and labor and at a comparatively great expense, to the extent oftentimes that the furnace is destroyed entirely.

On the other hand, radiated heat will not oxidize and scale, nor will oxidation occur where the hot gases, resulting from the flame blast, are directly applied after complete combustion has taken place, and it is my aim to take advantage of both of these principles in the application of my invention, with the objects in view of heating the rivets properly without scaling them, and also of prolonging the life of the furnace itself a substantially indefinite period.

By radiated heat, I mean a heat that is caused to be emitted or diffused from an exteriorly heated surface, rather than radiating from a common point.

It is a primary aim of the present invention, therefore, to overcome the objections stated in an entirely novel manner, and the broader invention resides in causing the rivets to be maintained out of direct contact with the flame blast, but in such position as to be properly heated and readily removable by tonging as usual. That is to say, the rivets are located in the furnace upon or within a suitable refractory support, so positioned interiorly thereof that the path of the blast flame is tangential of the support, heating the rivets by intensely radiated heat, after which the hot gases are diverted and swirl entirely around the support, and passing over the rivets thereon, in direct contact therewith, heats them further without oxidation.

Another object is to augment the intensification of the heat of the blast flame by bringing the swirling gases back again into the flame zone at the entrance to the furnace, thus utilizing their heat continuously.

Another object is to so removably support the rivet support within the furnace that it may readily be taken out and replaced at trifling expense, without substantially disturbing the rest of the furnace.

Other objects and advantages will appear from the following description, and the essential features of novelty will be pointed out more particularly in the appended claims.

To more clearly understand the invention reference will be made to the accompanying drawings, forming a part of this application, in which drawings like reference characters designate the same parts in the several views, of which—

Figure 2:
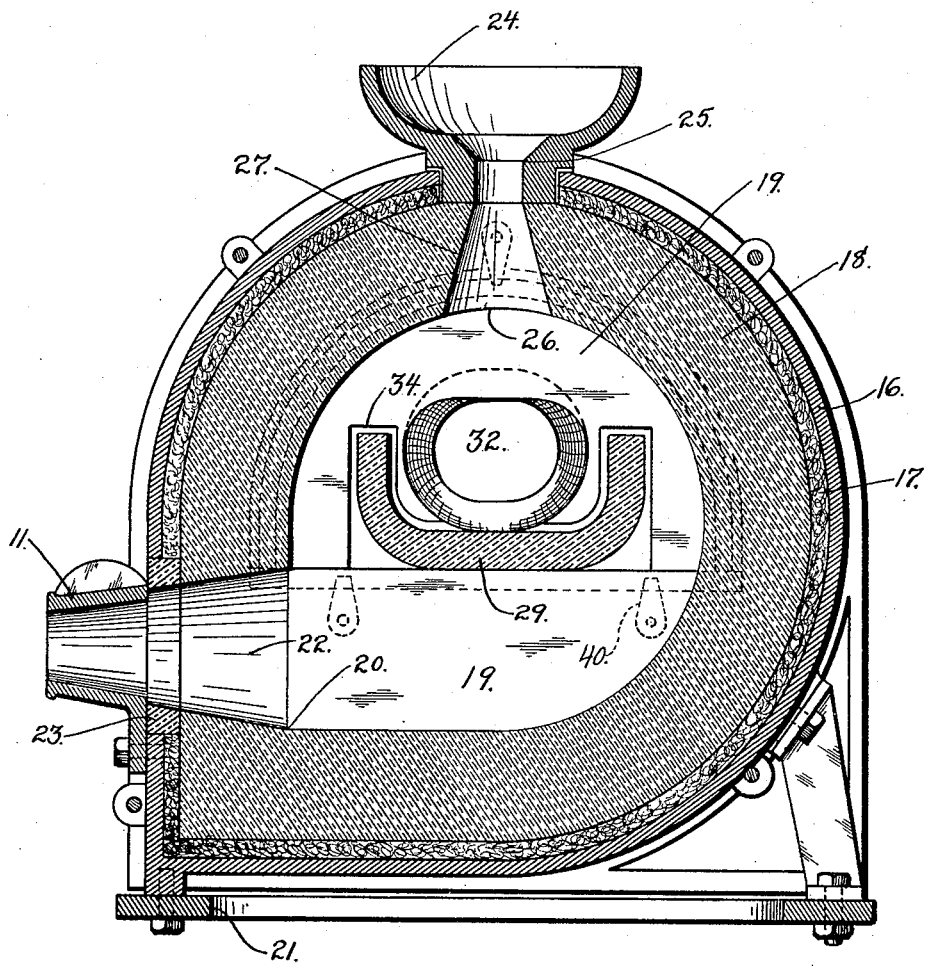

Figure 1, is a view in side elevation of my complete invention in assembled relation as a unitary portable whole, Fig. 2, is a vertical sectional view taken along the plane of the line 2—2 of Fig. 3, Fig. 3, is a vertical sectional view taken along the plane of the line 3—3 of Fig. 1, and Fig. 4, is a perspective view of the replaceable support for the enmassed rivets.

Before describing the complete features in detail, it may be stated that while the principal features of the invention strictly speaking reside properly in the forge itself and the mounting of the rivet support relatively thereto, there are also certain important advantages in so assembling all of the salient operating elements, relatively thereto, as to provide a compactly arranged and light structure portable as a unitary whole.

Referring first, therefore, to Fig. 1 showing such a preferred assembling of parts, 5 designates a light skeleton iron framework stand upon which the forge proper rests.

Within this framework is mounted a blower indicated at 6, preferably of the low pressure type, and driven by any suitable type of motor, such as an electric or an air motor, not shown. This blower may be carried by standards 7, which in turn are preferably secured, through slot and bolt connections indicated at 8, to the bottom of the framework 5, to permit of adjusting the blower into close contact with the lower elbow of an upright air pipe 9 leading and supplying the necessary air to a suitable burner 10, which is also preferably of the low pressure type. The nozzle of the burner discharges through a burner boss 11 into and through the flame opening of the forge.

On the opposite side a bracket 12 supports the fuel oil supply tank 13, provided with the usual attachments, and from which leads the cock controlled fuel oil pipe 14 to the burner, 15 indicating a needle valve for controlling the delivery of the oil to the burner.

Thus it will be seen that this structural arrangement is very compact and self contained as it were, which is a very important feature when it is considered that, in riveting the beams and girders of very tall buildings or other structures, these rivet forges are frequently moved from place to place and floor to floor.

Referring now more particularly to Fig. 2, it will be seen that the forge is substantially circular and entirely closed, excepting for the burner opening, the feed opening for the rivets, which is also an outlet for the products of combustion, and the tong openings at the sides for removing the heated rivets.

16 is the peripheral iron sheathing or casing, 18 the thickened refractory lining of fire clay or its equivalent, forming the combustion chamber 19 and the flame bed 20 of the forge, and 17 is an intermediate heat resisting filling, such as asbestos, between the refractory lining and the outer iron sheathing of the whole furnace.

The casing is suitably supported on an annular ring 21, which in turn rests on the framework 5, of Fig. 1, when employed.

The burner opening 22, through the lining 18, is preferably conical, opening at its flaring end into the combustion chamber at the bottom thereof, while its smaller end is formed by a refractory ring 23, registering with the burner boss 11, and in line with the packing 17 and outer casing to protect same from the flame blast.

24 is a bowl or other shaped hopper body for the rivets, having an elongated funnel-shaped gateway or feed spout 25, which hopper is suitably seated over openings formed through the top of the sheathing and packing.

The spout of the hopper registers with a feed opening 26 through the refractory lining 18, which feed opening 26 flares downwardly at its sides, as at 27 Fig. 2, and also at its ends as at 28 Fig. 3.

The feed opening 26 extends across the interior of the forge pot (Fig. 3) and is located to discharge directly into a suitable open rivet receptacle, or its equivalent, suitably supported within the forge pot in a suitable position substantially intermediate of its top and flame bed, so that the flame strikes the rivet support rather than the rivets themselves.

This rivet receptacle 29 is of highly refractory material and is preferably of pan shape, open at both ends, as seen in perspective in Fig. 4, although I wish it to be understood that I do not restrict myself to particular shape of the rivet support, excepting as may be specifically limited in the claims.

I have found, however, that the open-ended pan-shaped rivet support has its peculiar value in practice, especially where the rivets are to be tonged from both sides of the forge.

In such a case, the side walls of the forge are provided with enlarged openings 30, having suitable angular faces for fitting purposes, and adapted to receive corresponding refractory plugs 31, which plugs have sufficiently large openings 32 therethrough to enable operatives to tong out the rivets from the rivet containing receptacle, the bottom of which latter is disposed a slight distance below said tong openings, seating on ledges 33 of the sides 18, formed by the openings 30, with their end edges disposed in corresponding recesses 34 formed on the inside faces of the plugs, so that the plugs project over into the pan, as shown, and the openings being located a slight distance above the bottom of the pan, the rivets are prevented from falling out. It will be understood, of course, that in the case where a forge was built with only one tong opening, a single replaceable plug and arrangement just described might equally as well be employed.

The refractory side walls of the furnace have a heat resisting lining, the same as 16, disposed between them and side iron sheathing plates 35, which have openings 36 corresponding to the openings 30 in the side walls, the several parts of the furnace being securely tied together by the lateral tie-rods 37.

38 designates side securing plates, for the plugs 31, having a flanged beaded peripheral edge 39, and held in place by suitable securing lugs 40.

These plug securing plates have central openings 41, corresponding to the tong openings 32 of the plugs.

Before describing the operation of the forge, it may be stated here that I do not limit myself to the specific location or disposition of the burner opening. Also the circular nature of the wall, as shown, may be of a different contour and provided with deflecting means to obtain similar results. What I wish to emphasize is, that the flame blast is introduced so as not to directly strike the contents of the receptacle or article support, whatever its structure or position might be, to positively and intensely heat the surface that it touches, after which the resultant hot gases are caused to swirl around the remaining portion of the receptacle, with its contents, so that the same are enveloped by an intense heat, without causing oxidation of the rivets and substantial destructiveness to the furnace, at one position by a radiated heat and at another by the direct heat of the hot gases, after combustion has completely taken place.

With these remarks, it may be briefly stated that the flame blast through the opening 22, directed tangentially along the bottom of the rivet receptacle, will heat with all of its intensity that portion thereof. Striking the curved wall at the opposite side of the forge, the hot gases are caused to swirl upwardly and around above the rivet receptacle and downwardly of the other side, combining with the blast flame at its inlet, thus utilizing the hot gases over and over again and greatly intensifying the heat of the blast flame. At the same time the exhaust heat passing out through the outlet 26, pre-heats the rivets in the hopper, if the hopper is loaded, so that they are practically red hot before they reach the hotter ones below, in the rivet receptacle, which are being withdrawn by the operatives, with suitable tongs, through the tong openings 32.

From the fact that there is no oxidization and iron sulfid formed, the life of the furnace is prolonged greatly as compared to the old style, and indeed the life of the rivet receptacle is very lasting, as being heated from all around there is much less danger of its being cracked or broken.

When the receptacle is finally worn out, however, obviously it may be readily removed to be replaced by a new one with but the trifling expense of the receptacle itself.

To do this, one of the plug side securing plates is unfastened, and when its plug is removed the receptacle may be withdrawn through that plug opening. When a new receptacle is put in, a new plug may also be inserted if worn out, and the next time this operation becomes necessary, the one on the other side may be removed and replaced by a new one.

Having thus fully disclosed my invention, it will be understood that I do not limit myself to the exact details set forth, excepting as come within the purview of the ensuing claims and a reasonable construction of the scope thereof contemplating a fair range of equivalents.

What I do claim as new and patentable is:—

1. In a forge including a substantially closed combustion chamber having a tong opening, the combination of an article receiving support mounted in said chamber, below said tong opening, and in spaced relation to its top, bottom and peripheral wall; a feed inlet discharging to said support; and means for directing a blast flame into direct association with the bottom of said support but out of contact with the articles thereon, the interior of the forge functioning to cause the hot gases from said blast flame to swirl around over the top of said support into intimate contact with the articles thereon, substantially as described.

2. In a forge including a substantially closed combustion chamber having a substantially circular peripheral wall and a tong opening in an end wall, the combination of an article receiving support mounted in said chamber, below said tong opening, and in spaced relation to its top, bottom and peripheral wall; a feed inlet discharging to said support; and means for directing a blast flame across the bottom of said support, out of contact with the articles thereon, the interior substantially circular wall of the forge functioning to receive the impact of the blast flame and cause the hot gases therefrom to swirl around over the top of said support, into intimate contact with the articles thereon, and back again to meet the incoming blast flame, substantially as described.

3. In a forge including a substantially closed combustion chamber having a tong opening, the combination of a receptacle mounted in said chamber, below said tong opening, and in spaced relation to its top, bottom and peripheral wall; a feed inlet discharging into said receptacle; and means for directing a blast flame tangentially of said receptacle, out of contact with the articles therein, the interior of the forge functioning to cause the hot gases from said blast flame to swirl around over the top of said receptacle into intimate contact with the articles therein, substantially as described.

4. In a forge including a substantially closed combustion chamber having a tong opening in an end wall thereof, the combination of a receptacle mounted in said chamber, below said tong opening, and in spaced relation to its top, bottom and peripheral wall; a feed inlet discharging into said receptacle; and a burner inlet disposed below said receptacle for directing a blast flame across its bottom, out of contact with its contents, substantially as described.

5. In a forge including a substantially closed combustion chamber having an enlarged end wall aperture, in combination with an article receiving support extending longitudinally across said combustion chamber, adjacent said end wall aperture, in spaced relation to the top, bottom and peripheral wall of said chamber; a replaceable plug for filling said end wall aperture and having a tong opening therethrough adapted to open above said support; a feed inlet discharging to said support; and means for directing a blast flame across the bottom of said support, out of contact with the articles thereon, substantially as described.

6. In a forge including a substantially closed combustion chamber having an enlarged end wall aperture, in combination with a trough-like receptacle extending across said combustion chamber and having an open end opening into said aperture, said receptacle being disposed with its top, bottom and sides spaced relatively to the interior of the forge; a replaceable plug for filling said end wall aperture to abut the open end of said receptacle, said plug having a tong opening therethrough to communicate with the interior of said receptacle; a feed opening discharging into said receptacle; and means for directing a blast flame tangentially of said receptacle, out of contact with its contents, substantially as described.

7. In a forge including a substantially closed combustion chamber having an enlarged end wall aperture, in combination with a trough-like receptacle, extending across said combustion chamber and having an open end opening into said aperture, said receptacle being disposed with its top, bottom and sides spaced relatively to the interior of the forge, to provide for the passage of hot gases therearound; a replaceable plug for filling said end wall aperture and having a recessed inner face to receive the open end edge of said receptacle and also provided with a tong opening therethrough to communicate with the interior of said receptacle; a feed inlet discharging into said receptacle; and means for directing a blast flame tangentially of said receptacle, out of contact with its contents, substantially as described.

8. In a forge including a substantially closed combustion chamber having an enlarged aperture in each end wall thereof, in combination with an open ended trough-like receptacle longitudinally extending across said combustion chamber, between said end apertures, said receptacle being replaceably mounted with its top, bottom and sides spaced relatively to the interior of the forge, to provide for the passage of hot gases therearound; replaceable plugs for filling said end wall apertures, having tong openings therethrough to communicate with the interior of said receptacle; a feed inlet discharging into said receptacle; and means for directing a blast flame tangentially of said receptacle, out of contact with its contents, substantially as described.

9. In a forge including a substantially closed combustion chamber having a substantially circular peripheral wall and end walls provided with enlarged plug apertures, in combination with an elongated substantially U-shaped receptacle, open at its ends, replaceably mounted to extend across said combustion chamber with its open ends communicating with said plug apertures, and the top, bottom and sides of said receptacle being spaced relatively to the interior of the forge, to provide for the passage of hot gases therearound; replaceable plugs for said plug openings, having tong openings therethrough to communicate with the interior of said receptacle; a feed inlet discharging into said receptacle; and means for directing a blast flame across the substantially flat bottom of said receptacle, out of contact with its contents, substantially as described.

In testimony whereof, I affix my signature.

THEODORE W. MUCKLE.

Copies of this patent may be obtained for five cents each, by addressing the "Commissioner of Patents, Washington, D. C."